United States Patent
Hollis

(10) Patent No.: US 9,519,604 B2
(45) Date of Patent: Dec. 13, 2016

(54) SYSTEMS AND METHODS FOR FREQUENCY CONTROL ON A BUS THROUGH SUPERPOSITION

(71) Applicant: QUALCOMM Incorporated, San Diego, CA (US)

(72) Inventor: Timothy Mowry Hollis, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 14/250,996

(22) Filed: Apr. 11, 2014

(65) Prior Publication Data

US 2015/0293870 A1    Oct. 15, 2015

(51) Int. Cl.
G06F 13/42        (2006.01)
G06F 13/40        (2006.01)
H04L 25/49        (2006.01)

(52) U.S. Cl.
CPC ....... *G06F 13/4018* (2013.01); *G06F 13/4022* (2013.01); *G06F 13/42* (2013.01); *H04L 25/4917* (2013.01)

(58) Field of Classification Search
USPC ......... 710/105, 106, 110, 305, 316; 375/210
See application file for complete search history.

(56) References Cited

U.S. PATENT DOCUMENTS

| | | | |
|---|---|---|---|
| 5,144,160 A * | 9/1992 | Lee et al. ................. | 327/96 |
| 6,038,260 A * | 3/2000 | Emma et al. ............. | 375/259 |
| 6,295,323 B1 * | 9/2001 | Gabara ..................... | 375/257 |
| 7,072,415 B2 | 7/2006 | Zerbe et al. | |
| 7,308,058 B2 | 12/2007 | Zerbe et al. | |
| 7,822,143 B2 | 10/2010 | Kikuchi | |
| 8,284,848 B2 * | 10/2012 | Nam et al. ............... | 375/257 |
| 2003/0095606 A1 | 5/2003 | Horowitz et al. | |
| 2005/0220232 A1 | 10/2005 | Kunnari et al. | |
| 2009/0239559 A1 * | 9/2009 | Hollis ...................... | 455/500 |
| 2013/0010892 A1 | 1/2013 | Cronie et al. | |
| 2013/0223293 A1 * | 8/2013 | Jones et al. .............. | 370/276 |

FOREIGN PATENT DOCUMENTS

| | | |
|---|---|---|
| EP | 0179310 A2 | 4/1986 |
| EP | 1903733 A2 | 3/2008 |
| GB | 2183971 A | 6/1987 |

OTHER PUBLICATIONS

Hochschule, Winterthur Z., "Kapitel 5: Oigitale Übertragung im Basisband," Jan. 1, 2005, pp. 1-13, Retrieved from the Internet: URL:https://home.zhaw.ch/-rur/ntm/unterlagen/ntmkap531eicode.pdf [retrieved on Apr. 3, 2014], machine translation generated by Google.
International Search Report and Written Opinion for PCT/US2015/025301, mailed Jun. 22, 2015, 13 pages.
International Preliminary Report on Patentability for PCT/US2015/025301, mailed Mar. 18, 2016, 16 pages.

* cited by examiner

*Primary Examiner* — Khanh Dang
(74) *Attorney, Agent, or Firm* — Withrow & Terranova, PLLC

(57) ABSTRACT

Systems and methods for frequency control on a bus through superposition are disclosed. In one embodiment, instead of adding pins or increasing the operating frequency of the bus, three signals are placed on lines within the bus using superposition. In this fashion, three bits may be sent over two conductors, effectively obviating the need for an additional pin and effectively increasing the frequency of bit transmission without having to increase the clock speed.

26 Claims, 8 Drawing Sheets

Input Table

| A | B | C |
|---|---|---|
| 0 | 0 | L |
| 0 | 0 | R |
| 0 | 1 | L |
| 0 | 1 | R |
| 1 | 0 | L |
| 1 | 0 | R |
| 1 | 1 | L |
| 1 | 1 | R |

FIG. 3A

Output Table

| X | Y |
|---|---|
| ½ | 0 |
| 0 | ½ |
| 0 | 0 |
| 0 | 1 |
| 1 | 0 |
| ½ | ½ |
| 1 | ½ |
| ½ | 1 |

FIG. 3B

| Input Table 112 | | | | | | | | |
|---|---|---|---|---|---|---|---|---|
| A | 0 | 0 | 0 | 0 | 1 | 1 | 1 | 1 |
| B | 0 | 0 | 1 | 1 | 0 | 0 | 1 | 1 |
| C | L | R | L | R | L | R | L | R |

FIG. 5A

| Output Table 114 | | | | | | | | |
|---|---|---|---|---|---|---|---|---|
| X | 0 | -½ | 0 | -½ | ½ | -½ | ½ | 0 |
| Y | -½ | 0 | 0 | ½ | -½ | -½ | 0 | ½ |

116 → (col 4);  118 → (col 6)

FIG. 5B

SYSTEMS AND METHODS FOR FREQUENCY CONTROL ON A BUS THROUGH SUPERPOSITION

BACKGROUND

I. Field of the Disclosure

The technology of the disclosure relates generally to improving signaling on a data bus.

II. Background

Computing devices typically have multiple integrated circuits positioned on a circuit board. Such integrated circuits may be processing devices, memory units, or have other functionality. These multiple integrated circuits may be communicatively interconnected through a data bus. Likewise, peripheral devices may also be interconnected to the integrated circuits on the circuit board through a data bus.

As processing speed has improved inside the integrated circuits, pressure has been put on the data bus to also improve speed. For example, with improved processing speed, there is a need for faster memory access across these sorts of data buses. Speed on the data bus is a function of bandwidth and frequency. Both bandwidth and frequency involve engineering tradeoffs.

Bandwidth may be increased by increasing the number of conductors that are used by the data bus. However, each conductor added needs a pin on each integrated circuit through which the conductor is coupled to the integrated circuit. Such pins are relatively expensive as a manufacturing cost, and the additional area required to route conductors to the pin is also expensive in terms of the space required to accommodate such routing areas. Frequency may be increased, but such frequency increases are achieved at the expense of increased power consumption due to higher clock frequencies and increased electromagnetic compatibility (EMC) issues.

SUMMARY OF THE DISCLOSURE

Embodiments disclosed in the detailed description include systems and methods for frequency control on a bus through superposition. Instead of adding pins or increasing the operating frequency of the bus, three encoded signals are placed on two lines within the bus using superposition. In this fashion, three bits may be sent over two conductors, effectively obviating the need for an additional pin and effectively increasing the frequency of bit transmission without having to increase the clock speed.

In an exemplary embodiment, the encoding causes two of the three bits to be provided as single ended signals and the third bit is provided as a differential signal that is steered to a pin associated with one or the other of the first two bits. Thus, given a baseline bandwidth, comparable bandwidths may be achieved at two thirds the frequency without increasing pin counts; comparable bandwidths may be achieved at two thirds the number of pins with the same frequency or the bandwidth may be increased by fifty percent while keeping the frequency and pin count constant.

In this regard in one embodiment, a method for conveying data across a bus is disclosed. The method comprises parsing a data signal into a plurality of bits. The method also comprises identifying a first bit of the plurality of bits for transmission on a first conductor of the bus through a first pin. The method also comprises identifying a second bit of the plurality of bits for transmission on a second conductor of the bus through a second pin. The method also comprises steering a third bit of the plurality of bits onto the first bit or the second bit based on the value of the third bit. The method also comprises combining the third bit with the first bit or second bit based on the steering and sending a combined bit to one of the first conductor and second conductor based on which bit was combined. The method also comprises sending the first, second, and third bits to the bus through the first and second pins.

In another embodiment, a transmitter within an integrated circuit configured to send signals across a data bus is disclosed. The transmitter comprises a first bit source configured to generate a first bit, the first bit source coupled to a first external pin on the integrated circuit. The transmitter also comprises a second bit source configured to generate a second bit, the second bit source coupled to a second external pin on the integrated circuit. The transmitter also comprises a third bit source configured to generate a third bit. The transmitter also comprises a switch assembly associated with the third bit source and configured to switch the third bit source between the first external pin and the second external pin.

In another embodiment, a receiver within an integrated circuit configured to receive signals from a data bus is disclosed. The receiver comprises a first external pin coupled to a first load within the integrated circuit. The receiver also comprises a second external pin coupled to a second load within the integrated circuit. The receiver also comprises a control system coupled to the first load and the second load. The control system is configured to detect a first bit as a single ended signal on the first load. The control system is also configured to detect a second bit as a single ended signal on the second load. The control system is also configured to detect a third bit as a differential signal between the first load and the second load.

In another embodiment, a data transmission system is disclosed. The data transmission system comprises a two wire data bus. The data transmission system also comprises a transmitter within an integrated circuit. The transmitter comprises a first bit source configured to generate a first bit, the first bit source coupled to a first external pin on the integrated circuit, the first external pin coupled to a first wire of the two wire data bus. The transmitter also comprises a second bit source configured to generate a second bit, the second bit source coupled to a second external pin on the integrated circuit, the second external pin coupled to a second wire of the two wire data bus. The transmitter also comprises a third bit source configured to generate a third bit. The transmitter also comprises a switch assembly associated with the third bit source and configured to switch the third bit source between the first external pin and the second external pin.

BRIEF DESCRIPTION OF THE FIGURES

FIG. 3A is a table of encoded input bits that may be sent across a bus by the transmitter of FIG. 2;

FIG. 3B is a table of the output values received from the bus and transmitter of FIG. 2;

FIG. 5A is a table of encoded input bits that may be sent across a bus by the transmitter of FIG. 4;

FIG. 5B is a table of the output values received from the bus and transmitter of FIG. 4;

DETAILED DESCRIPTION

Figure 1:
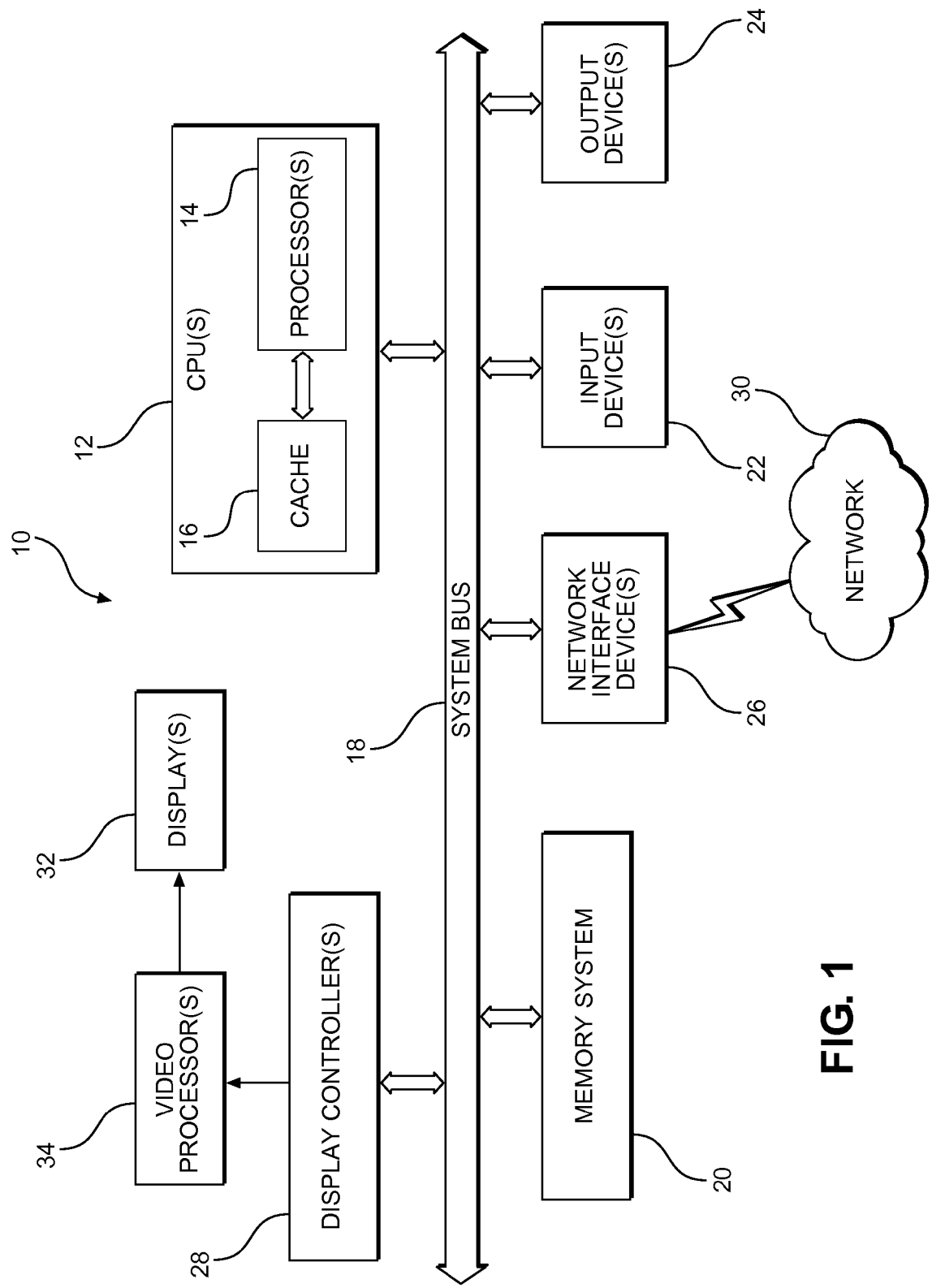
FIG. 1 is a block diagram of an exemplary processor based system that can include one or more buses operating according to exemplary embodiments of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include systems and methods for frequency control on a bus through superposition. Instead of adding pins or increasing the operating frequency of the bus, three encoded signals are placed on two lines within the bus using superposition. In this fashion, three bits may be sent over two conductors, effectively obviating the need for an additional pin and effectively increasing the frequency of bit transmission without having to increase the clock speed.

In an exemplary embodiment, the encoding causes two of the three bits to be provided as single ended signals and the third bit is provided as a differential signal that is steered to a pin associated with one or the other of the first two bits. Thus, given a baseline bandwidth, comparable bandwidths may be achieved at two thirds the frequency without increasing pin counts; comparable bandwidths may be achieved at two thirds the number of pins with the same frequency or the bandwidth may be increased by fifty percent while keeping the frequency and pin count constant.

In this regard, FIG. 1 is an example of a processor-based system 10. In an exemplary embodiment, the processor-based system 10 may be a computing device including, but not limited to mobile terminals (such as smart phones, cellular phones, tablets, laptops, or the like), desktop computing devices, or other computing devices, including but not limited to a set top box, an entertainment unit, a navigation device, a communications device, a fixed location data unit, a mobile location data unit, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

The processor-based system 10 includes one or more central processing units (CPUs) 12, each including one or more processors 14. The CPU(s) 12 may have cache memory 16 coupled to the processor(s) 14 for rapid access to temporarily stored data. The CPU(s) 12 is coupled to a system bus 18 and can intercouple devices included in the processor-based system 10. As is well known, the CPU(s) 12 communicates with these other devices by exchanging address, control, and data information over the system bus 18. For example, the CPU(s) 12 can communicate bus transaction requests to a memory system 20.

Other devices can be connected to the system bus 18. As illustrated in FIG. 1, these devices can include the memory system 20, one or more input devices 22, one or more output devices 24, one or more network interface devices 26, and one or more display controllers 28, as examples. The input device(s) 22 can include any type of input device, including but not limited to input keys, switches, voice processors, etc. The output device(s) 24 can include any type of output device, including but not limited to audio, video, other visual indicators, etc. The network interface device(s) 26 can be any devices configured to allow exchange of data to and from a network 30. The network 30 can be any type of network, including but not limited to a wired or wireless network, private or public network, a local area network (LAN), a wide local area network (WLAN), and the Internet. The network interface device(s) 26 can be configured to support any type of communication protocol desired.

The CPU(s) 12 may also be configured to access the display controller(s) 28 over the system bus 18 to control information sent to one or more displays 32. The display controller(s) 28 sends information to the display(s) 32 to be displayed via one or more video processors 34, which process the information to be displayed into a format suitable for the display(s) 32. The display(s) 32 can include any type of display, including but not limited to a cathode ray tube (CRT), a liquid crystal display (LCD), a plasma display, etc.

As is readily apparent, the devices within the processor based system 10 communicate on the system bus 18. Other buses (not illustrated) may exist between specific devices or to peripherals such as memory sticks, printers, or the like. As noted above, there is increasing pressure to increase the speed with which the devices within the processor based system 10 operate. Accordingly, there is pressure to increase the speed with which the devices communicate with one another to take advantage of increased processor and clock speeds. Typically, increases in speed are achieved through increased bandwidth or increased frequency. Increased bandwidth is usually achieved through increasing the number of conductive elements that couple the devices. However, each such conductive element requires a corresponding pin at the device. As noted, such pins take space and are a relatively expensive portion of such a device. Furthermore, routing such conductive elements becomes increasingly challenging as the number of such conductive elements increases. Increases in speed may be achieved through increases in clock speeds, but increases in clock speed increase electromagnetic compatibility concerns as well as consume more power. Accordingly, there is a need to be able to improve communication speeds without having to increase clock speed or add a pin.

The present disclosure provides multiple techniques through which improved communication speeds may be achieved. In an exemplary embodiment, encoding a data stream allows two conductors to transfer two single ended signals and the same two conductors are used to transfer an additional differential signal through current or voltage superposition.

Figure 2:
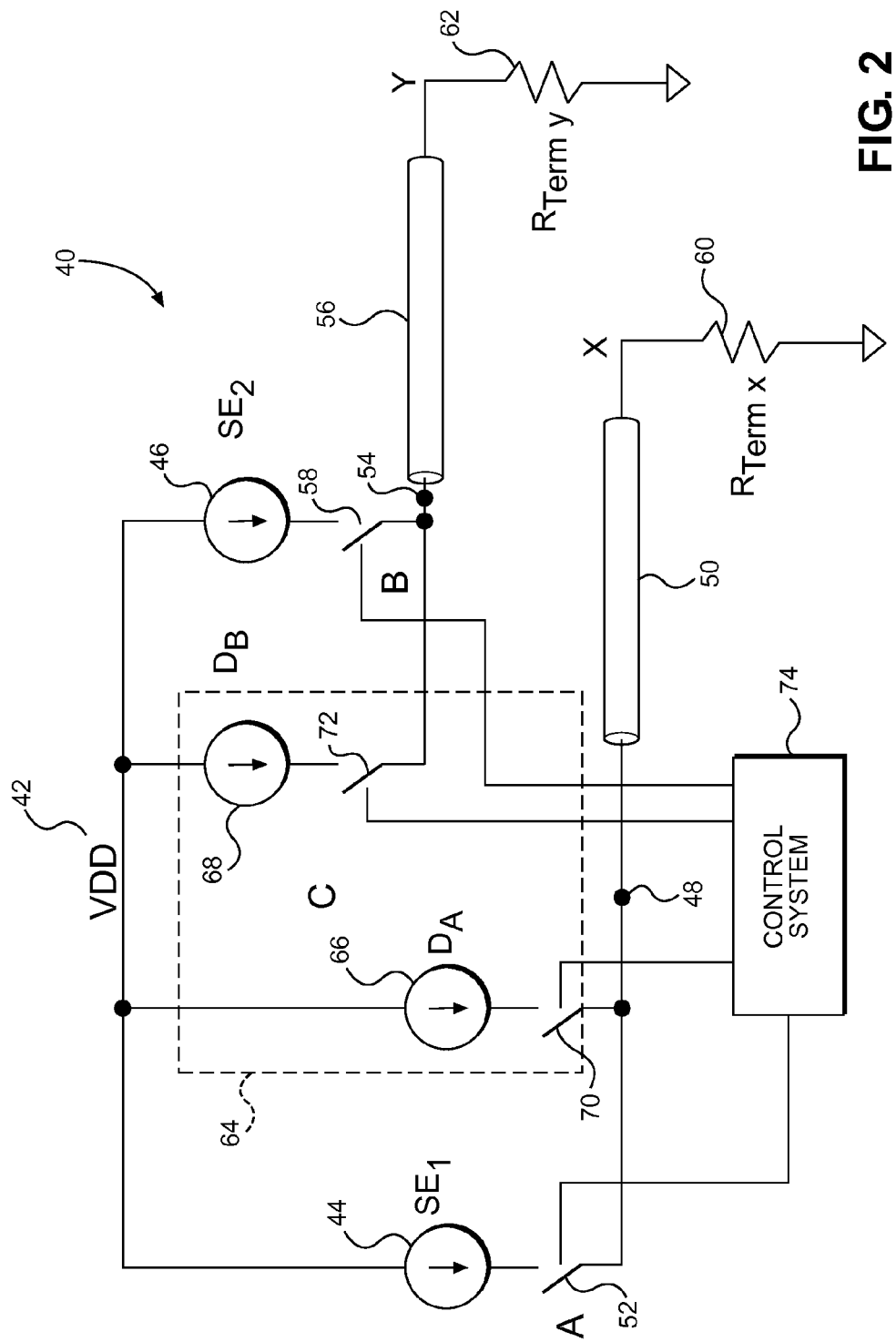
FIG. 2 is a simplified circuit diagram of a transmitter associated with a data bus according to an exemplary current based embodiment of the present disclosure.

In this regard, FIG. 2 illustrates a simplified schematic for an exemplary embodiment of a current based transmitter 40. A voltage source $V_{DD}$ 42 is provided to a first current source 44 and a second current source 46. The first current source 44 is selectively coupled to a pin 48 that is coupled to a first conductive medium 50. A switch 52 provides the selective connection for the first current source 44. The second current source 46 is selectively coupled to a pin 54 that is coupled to a second conductive medium 56. A switch 58 provides the selective connection for the second current source 46. The conductive media 50, 56 are coupled to respective loads $R_{termx}$ 60 and $R_{termy}$ 62. This current-mode embodiment maintains a constant driver impedance, which facilitates better signal integrity. It should be noted that in some embodiments, the entire circuit may be flipped in polarity without losing the benefits of the present disclosure.

With continued reference to FIG. 2, in an exemplary embodiment the pin 48 and pin 54 form an external interface for an integrated circuit chip and the conductive media 50, 56 are wires on a printed circuit board that form a bus, such as system bus 18. Similarly, respective loads $R_{termx}$ 60 and $R_{termy}$ 62 are part of a receiver in a second integrated circuit chip that is configured to receive signals on the conductive media 50, 56.

With continued reference to FIG. 2, a differential current source 64 includes a first differential source 66 and a second differential source 68. The first differential source 66 is selectively coupled to the pin 48 by a switch 70. The second differential source 68 is selectively coupled to the pin 54 by a switch 72

With continued reference to FIG. 2, a control system 74 controls switches 52, 58, 70, and 72. Data to be transmitted from the current based transmitter 40 is generated by other components within the associated integrated circuit and passed to the control system 74. The control system 74 encodes and orders bits for transmission and then activates switches 52, 58, 70, and 72 to couple the current sources 44, 46 and 64 to the pins 48, 54. In this fashion, the first current source 44 acts as a first single ended ($SE_1$) bit source, the second current source 46 acts as a second single ended ($SE_2$) bit source, and the differential current source 64 uses both pins 48, 54 as a differential path. The differential current source 64 steers its bits onto the conductive media 50, 56 according to a predefined table.

In this regard, FIG. 3A illustrates the encoded input bits as the predefined table 80. The first current source 44 corresponds to bit A. The second current source 46 corresponds to bit B, and the differential current source 64 corresponds to bit C. The differential current source 64 steers current to the "left" (i.e., pin 48) or to the "right" (i.e., pin 54) depending on if the third bit is a zero or a one. In an exemplary embodiment, left corresponds to zero. FIG. 3B illustrates the output table 82 of signals received at the $R_{termx}$ 60 and $R_{termy}$ 62. Note that as mapped in table 80, two of the eight input combinations 010 and 101 would map to identical outputs. Accordingly, one of these input combinations (e.g., 010) is mapped to zeroes on both pins 48, 54 to avoid duplicate output entries. This mapping is shown at 84 and contrasted with the output 86 in output table 82.

By mapping the third bit onto the pin 48 or 54, the currents from the respective current sources add to create a superposition signal. The receiver at the far end of the data bus (e.g., system bus 18) extracts the differential signal from the two single ended signals and reconstructs the original bit sequence. By sending three bits in the time normally allocated to two bits, embodiments of the present disclosure relatively increase the data rate by fifty percent without needing to add an extra pin or increase the frequency with which bits are transmitted. This increased efficiency allows the designers to optimize design attributes based on design needs. That is, the data rate may be increased as noted. Alternatively, the data rate may be maintained, but the clock frequency be reduced or the total pin count reduced. While FIG. 2 showed the creation of the third bit through the superposition of current, the present disclosure is not so limited. Voltage may also be used.

Figure 4:
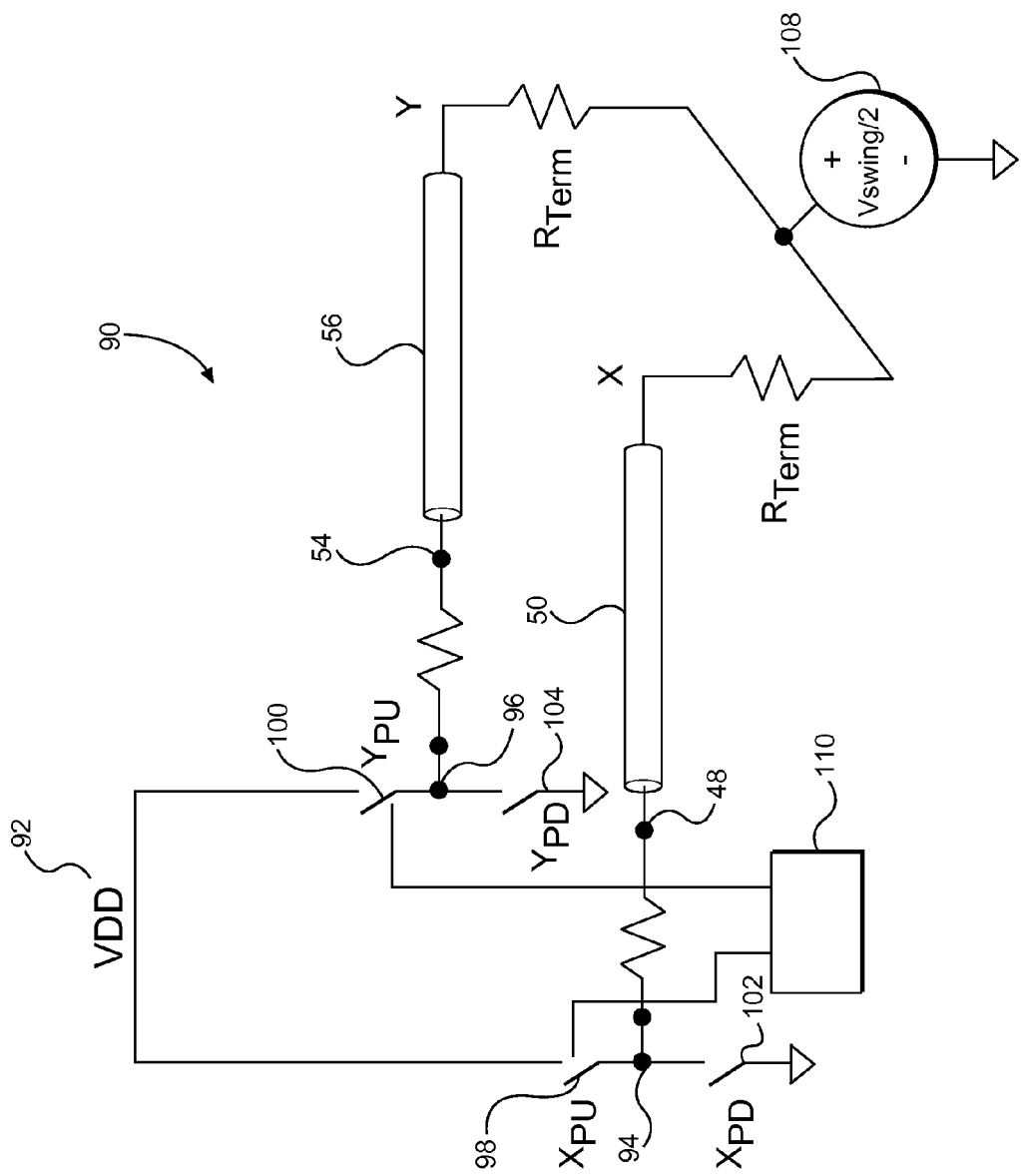
FIG. 4 is a simplified circuit diagram of a transmitter associated with a data bus according to an exemplary voltage based embodiment of the present disclosure.

In this regard, FIG. 4 illustrates an exemplary voltage based transmitter 90. A voltage source $V_{DD}$ 92 is provided to a first node 94 and a second node 96 by respective switches 98, 100. Nodes 94, 96 are, in turn, coupled to ground by respective switches 102, 104. Switches 98, 100 are sometimes referred to as pull up (PU) switches. Switches 102, 104 are sometimes referred to as pull down (PD) switches. The node 94 may be coupled to the pin 48 that is coupled to the first conductive medium 50. The second node 96 is coupled to the pin 54 that is coupled to the second conductive medium 56. The conductive media 50, 56 are coupled to respective loads $R_{termx}$ 60 and $R_{termy}$ 62. The $R_{termx}$ 60 and $R_{termy}$ 62 are raised to Vswing/2 by a voltage node 108.

With continued reference to FIG. 4, a control system 110 may control the switches 98, 100, 102, and 104. As with the current based transmitter 40, the switches are controlled to send encoded bits across the conductive media 50, 56. In this way, voltage levels of −½ Vswing, 0, and ½ Vswing may be created across $R_{termx}$ 60 and $R_{termy}$ 62. In this fashion, the voltage based transmitter 90 may include a first single ended bit source, a second single ended bit source, and a differential path. The differential source steers its bits onto the conductive media 50, 56 according to a predefined table.

In this regard, FIG. 5A illustrates input table 112 and FIG. 5B illustrates output table 114 analogous to input table 80 and output table 82. As with the current based transmitter 40, there are two situations that result in the same output at $R_{termx}$ 60 and $R_{termy}$ 62 (e.g., 010 and 101, which both would result in −½ and −½). Accordingly, one of these input combinations (e.g., 010) is mapped to zeroes on both pins 48, 54 to avoid duplicate output entries. This mapping is shown at 116 and contrasted with the output 118 in output table 114.

Note that having three voltage levels has an additional advantage. In particular, having three voltage levels provides more voltage margin than 4-PAM (pulse amplitude modulation), although less than 2-PAM. However, the increased data rate relative to 2-PAM makes embodiments of the present disclosure more attractive than 2-PAM. Preserving the voltage margins increases the ability of the receiver to discriminate between different signals and thus reduces error rates.

While the embodiments of FIGS. 2 and 4 provide better data rates than conventional signaling algorithms while preserving voltage margins, these embodiments may be further improved by pre-coding the signals for power savings. In the simplest embodiments, where the signal levels are ones and zeroes (i.e., ground terminated), the signal stream is examined to see if there are more ones or zeroes. Because the zeroes reflect less power expenditure (i.e., you don't have to use current or voltage to create or send a zero), sending more zeroes across the conductive media 50, 56 results in power savings relative to a signal that has more ones. Accordingly, an additional facet of the present disclosure may selectively invert such a simple signal stream so that a signal stream that would normally have more ones than zeroes now has more zeroes than ones. When this inverted signal is sent across the conductive media 50, 56, power is saved compared to what would have been sent absent inversion. A power management flag may also be sent so the receiver knows that the power management algorithm is being used and de-inverts the received signal. For embodiments that are not ground terminated (i.e., Vtt-terminated) power consumption may be minimized by minimizing transmissions at either of the voltage extremes.

Figure 6:
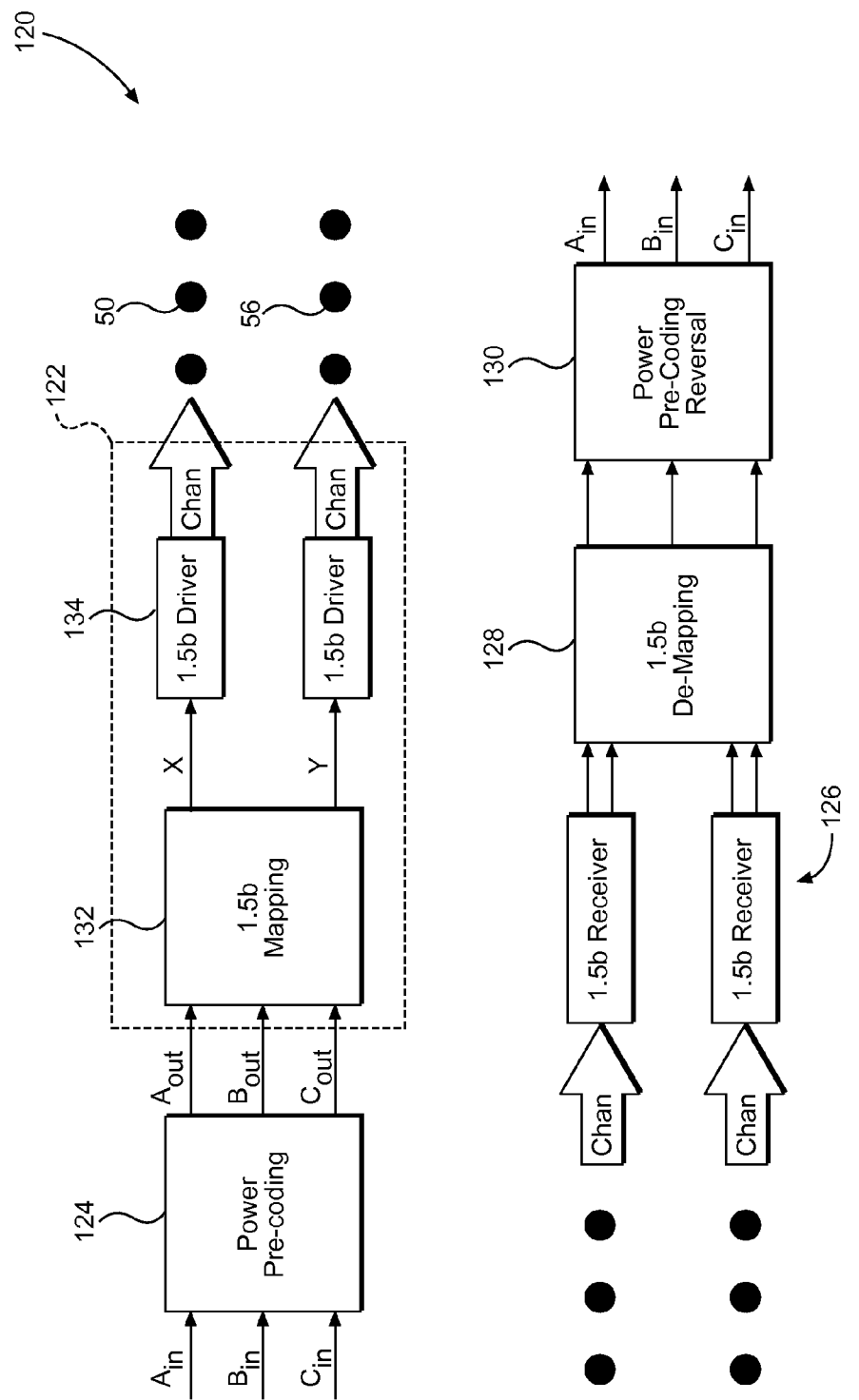
FIG. 6 is a simplified block diagram of a system that may be used with the transmitter of FIG. 2 or FIG. 4 to pre-code data for the bus for power reduction.

In this regard, FIG. 6 illustrates a three bit signaling system 120 with power pre-coding elements. In particular, the three bit signaling system 120 includes a three bit transmitter 122, which may be the current based transmitter 40 or the voltage based transmitter 90. The three bit transmitter 122 is coupled to the conductive media 50, 56. The three bit transmitter 122 receives a power pre-coded signal from power pre-coding module 124. At the far end of the conductive media 50, 56, a receiver 126 receives the bits from the conductive media and provides the bits to a demapping module 128 which looks at the received values and compares the received valves to a mapping table to extract the sent bits (e.g., using tables 112, 114). The demapped bits are passed to a power pre-coding reversal module 130 and if the receiver received the power management flag, the bits are inverted as needed.

With continued reference to FIG. 6, the three bit transmitter 122 may include a mapping module 132 and drivers 134. The drivers 134 may be the current sources 44, 46 or the pull up and pull down switches of the voltage based transmitter 90.

In this regard, the following pseudo-code may be effective for the current mode pre-coding:

```
If sum Ain > Width/2 AND sum Bin > width/2 AND sum Bin > sum Ain
    Aout gets inverted Bin
    Bout gets inverted Ain
    Cout gets Cin
    Aflag gets '1'
else if sum Ain > Width/2
    Aout gets inverted Ain
    Bout gets Bin
    Cout gets Cin
    Bflag gets '1'
else if sum Bin > Width/2
    Aout gets Ain
    Bout gets inverted Bin
    Cout gets Cin
    Cflag gets '1'
else
    Aout gets Ain
    Bout gets Bin
    Cout gets Cin
    All Flags get '0'
End
```

Figure 7:
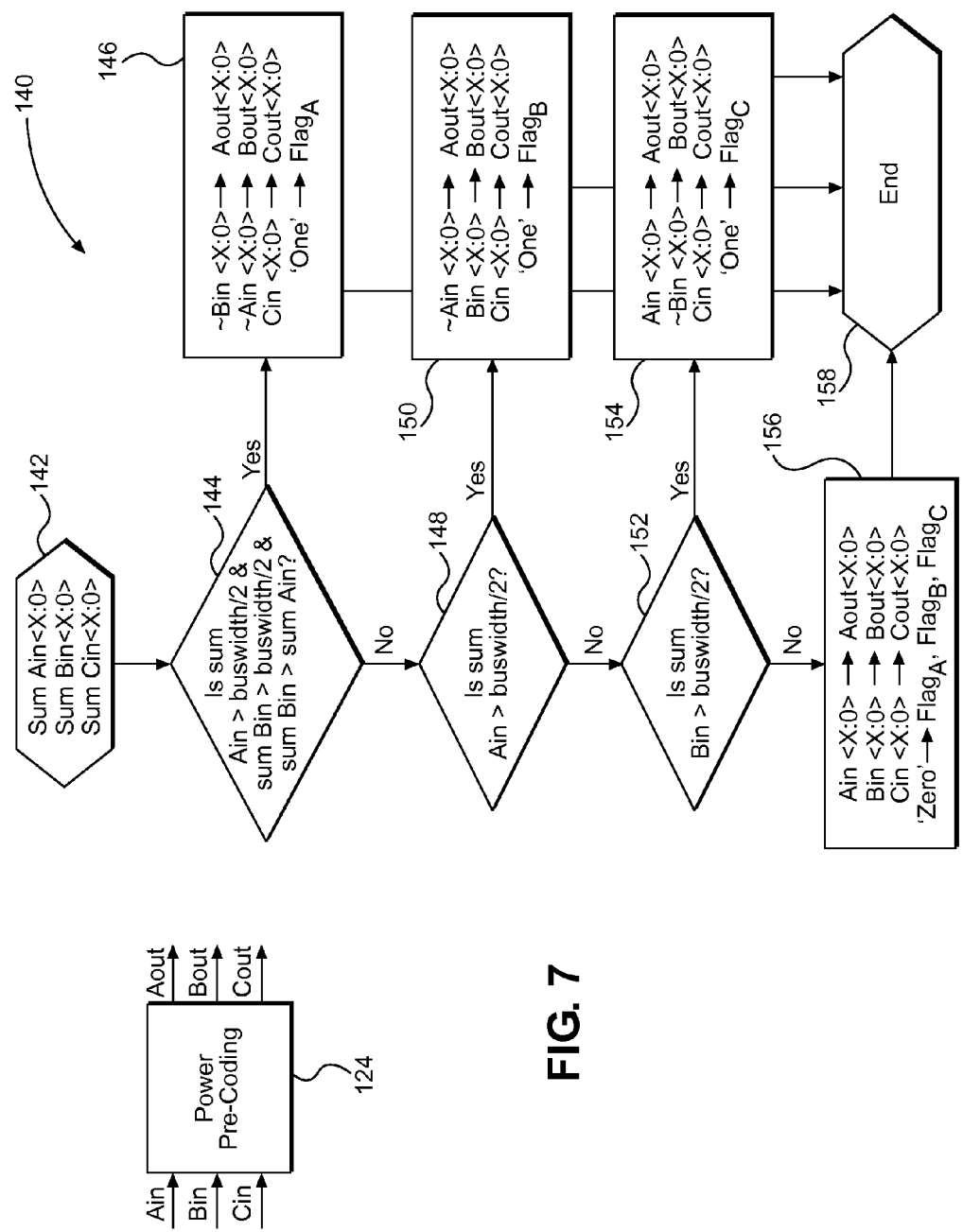
FIG. 7 is a flow chart illustrating an exemplary embodiment of pre-coding a current mode based embodiment.

The functions achieved through the pseudo-code of the preceding paragraph are illustrated by process 140 in FIG. 7. The process 140 begins with a summation of Ain, Bin, and Cin of power pre-coding module 124 (block 142). The power pre-coding module 124 determines if the sum Ain>buswidth/2 and the sum Bin>buswidth/2 and the sum of Bin>sum Ain (block 144). If the answer is yes, then Aout gets inverted Bin and Bout gets inverted Ain. Cout gets Cin. Flag$_A$ is set to one (block 146). If, however, the answer to block 144 is no, then the power pre-coding module 124 determines if the sum Ain is greater than buswidth/2 (block 148). If the answer to block 148 is yes, then Aout gets an inverted Ain; Bout gets Bin; and Cout gets Cin. Flag$_B$ is set to one (block 150).

With continued reference to FIG. 7, if the answer to block 148 is no, then the power pre-coding module 124 determines if the sum Bin is greater than buswidth/2 (block 152). If the answer to block 152 is yes, then Aout gets Ain and Cout gets Cin while Bout gets an inverted Bin. Flag$_C$ is set to one (block 154). If however, the answer to block 152 is no, then no inversion occurs and the flags are set to zero (block 156). The process ends at block 158.

Similarly, the following pseudo-code may be effective for the voltage mode pre-coding:

```
If sum Ain > width/2
    Aout gets inverted Ain
    Aflag gets '1'
else
    Aout gets Ain
    Aflag gets '0'
end
If sum Bin > width/2
    Bout gets inverted Bin
    Bflag gets '1'
else
    Bout gets Bin
    Bflag gets '0'
end
If sum Cin > width/2
    Cout gets inverted Cin
    Cflag gets '1'
else
    Cout gets Cin
    Cflag gets '0'
end
```

Figure 8:
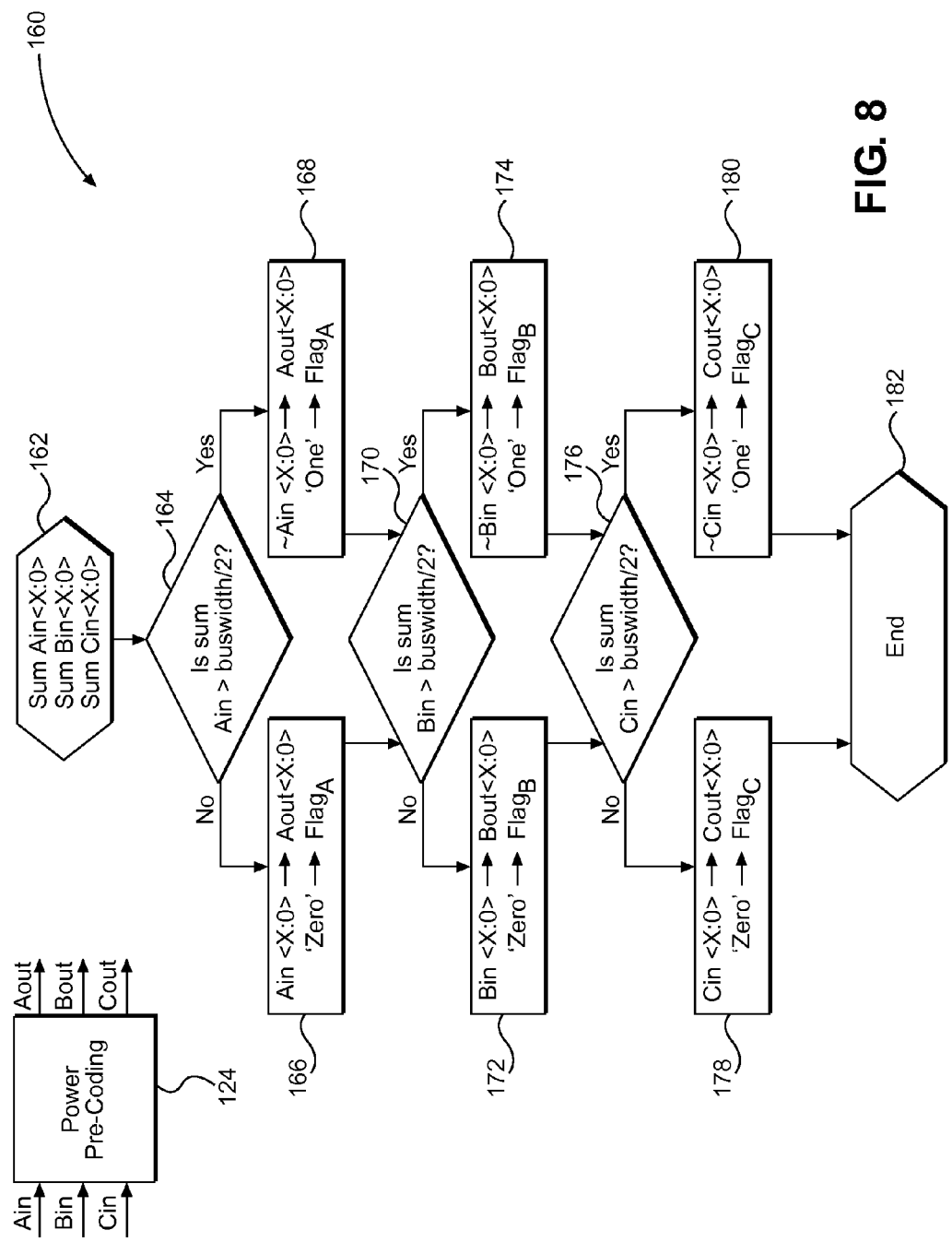
FIG. 8 is a flow chart illustrating an exemplary embodiment of pre-coding a voltage mode based embodiment.

The functions achieved through the pseudo-code of the preceding paragraph are illustrated by process 160 in FIG. 8. The process 160 begins with the power pre-coding module 124 determining the sum of Ain, Bin, and Cin (block 162). The power pre-coding module 124 determines if the sum Ain is greater than buswidth/2 (block 164). If the answer to block 164 is no, then Aout gets Ain and the Flag$_A$ is set to zero (block 166). If, however, the answer to block 164 is yes, then Aout gets inverted Ain and the Flag$_A$ is set to one (block 168).

With continued reference to FIG. 8, after setting the Flag$_A$, the power pre-coding module 124 determines if the sum Bin is greater than buswidth/2 (block 170). If the answer to block 170 is no, then Bout gets Bin and the Flag$_B$ is set to zero (block 172). If, however, the answer to block 170 is yes, then Bout gets inverted Bin and the Flag$_B$ is set to one (block 174).

With continued reference to FIG. 8, after setting the Flag$_B$, the power pre-coding module 124 determines if the sum Cin is greater than buswidth/2 (block 176). If the answer to block 176 is no, then Cout gets Cin and the Flag$_C$ is set to zero (block 178). If, however, the answer to block 176 is yes, then Cout gets inverted Cin and the Flag$_C$ is set to one (block 180). The process ends at block 182.

The use of such pre-coding algorithms may result in signaling power being reduced by 11.32% for the current mode and full swing transitions reduced by 6.13%. Likewise, the signaling power is reduced by 6.73% in the voltage mode and full swing transitions are reduced by 16.69%.

The systems and methods for frequency control according to embodiments disclosed herein may be provided in or integrated into any processor-based device. Examples, without limitation, include smart phones, tablets, computing devices and the like.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for conveying data across a bus, comprising:
   parsing a data signal into a plurality of bits;
   identifying a first bit of the plurality of bits for transmission on a first conductor of the bus through a first pin;
   identifying a second bit of the plurality of bits for transmission on a second conductor of the bus through a second pin;
   steering a third bit of the plurality of bits onto the first bit or the second bit based on the value of the third bit;
   combining the third bit with the first bit or second bit based on the steering and sending a combined bit to one of the first conductor and second conductor based on which bit was combined; and
   sending the first, second, and third bits to the bus through the first and second pins.

2. The method of claim 1, further comprising representing the first bit with a first current level and representing the second bit with a second current level.

3. The method of claim 2, further comprising representing the third bit with a third current level.

4. The method of claim 3, wherein combining the third bit with the first bit or second bit comprises adding the third current level to the first current level or the second current level.

5. The method of claim 1, further comprising representing the first bit with a first voltage level and representing the second bit with a second voltage level.

6. The method of claim 5, further comprising representing the third bit with a third voltage level.

7. The method of claim 6, wherein combining the third bit with the first bit or second bit comprises adding the third voltage level to the first voltage level or the second voltage level.

8. The method of claim 1, wherein the first bit comprises a first single ended signal and the second bit comprises a second single ended signal.

9. The method of claim 1, wherein the third bit comprises a differential signal.

10. The method of claim 1, further comprising preconditioning the plurality of bits for power savings.

11. The method of claim 10, wherein preconditioning comprises determining a number of ones compared to a number of zeroes in the plurality of bits and if the number of ones is larger than the number of zeroes, inverting ones and zeroes.

12. The method of claim 1, further comprising encoding the first bit, the second bit and the third bit according to a predefined table.

13. The method of claim 12, further comprising avoiding duplication of output entries in the predefined table by assigning fixed values to one of such duplicate entries.

14. A transmitter within an integrated circuit configured to send signals across a data bus, the transmitter comprising:
   a first bit source configured to generate a first bit, the first bit source coupled to a first external pin on the integrated circuit;
   a second bit source configured to generate a second bit, the second bit source coupled to a second external pin on the integrated circuit;
   a third bit source configured to generate a third bit;

a control system configured to:
  parse a data signal into a plurality of bits;
  identify the first bit within the plurality of bits for transmission on a first conductor of the data bus through the first external pin; and
  identify the second bit within the plurality of bits for transmission on a second conductor of the data bus through the second external pin; and
a switch assembly associated with the third bit source and configured to switch the third bit source between the first external pin and the second external pin based on steering from the control system.

15. The transmitter of claim 14, wherein the first bit source comprises a first voltage source and the second bit source comprises a second voltage source.

16. The transmitter of claim 15, wherein the third bit source comprises a third voltage source and the switch assembly causes a superposition of voltages when the third bit is directed to the first external pin with the first bit or the third bit is directed to the second external pin with the second bit.

17. The transmitter of claim 14, wherein the first bit source comprises a first current source and the second bit source comprises a second current source.

18. The transmitter of claim 17, wherein the third bit source comprises a third current source and the switch assembly causes a superposition of currents when the third bit is directed to the first external pin with the first bit or the third bit is directed to the second external pin with the second bit.

19. The transmitter of claim 14, wherein the first bit source is configured to create a first single ended signal with the first bit and the second bit source is configured to create a second single ended signal with the second bit.

20. The transmitter of claim 14, wherein the third bit source is configured to create a differential signal with the third bit.

21. The transmitter of claim 14, wherein the third bit source comprises a first sub source and a second sub source.

22. The transmitter of claim 14, further comprising an encoder configured to encode the first bit, the second bit and the third bit according to a predefined table.

23. The transmitter of claim 22, wherein the predefined table is defined to avoid duplicate output entries.

24. The transmitter of claim 21, wherein the switch assembly comprises:
  a first switch selectively coupling the first bit source to the first external pin;
  a second switch selectively coupling the second bit source to the second external pin;
  a third switch selectively coupling the first sub source to the first external pin; and
  a fourth switch selectively coupling the second sub source to the second external pin.

25. The transmitter of claim 14 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

26. A data transmission system comprising:
a two wire data bus;
a transmitter within an integrated circuit, the transmitter comprising:
  a first bit source configured to generate a first bit, the first bit source coupled to a first external pin on the integrated circuit, the first external pin coupled to a first wire of the two wire data bus;
  a second bit source configured to generate a second bit, the second bit source coupled to a second external pin on the integrated circuit, the second external pin coupled to a second wire of the two wire data bus;
  a third bit source configured to generate a third bit;
  a control system configured to:
    parse a data signal into a plurality of bits;
    identify the first bit within the plurality of bits for transmission on the first wire of the two wire data bus through the first external pin; and
    identify the second bit within the plurality of bits for transmission on the second wire of the two wire data bus through the second external pin; and
  a switch assembly associated with the third bit source and configured to switch the third bit source between the first external pin and the second external pin based on steering from the control system.

* * * * *